US007358897B2

(12) United States Patent
Camp, Jr.

(10) Patent No.: US 7,358,897 B2
(45) Date of Patent: Apr. 15, 2008

(54) APPARATUS, METHODS AND COMPUTER PROGRAM PRODUCTS FOR GPS SIGNAL ACQUISITION USING AN ADAPTIVE SEARCH ENGINE

(75) Inventor: William O. Camp, Jr., Chapel Hill, NC (US)

(73) Assignee: Sony Ericsson Mobile Communicatios AB, Lund (SE)

( * ) Notice: Subject to any disclaimer, the term of this patent is extended or adjusted under 35 U.S.C. 154(b) by 388 days.

(21) Appl. No.: 10/919,174

(22) Filed: Aug. 16, 2004

(65) Prior Publication Data

US 2006/0033658 A1    Feb. 16, 2006

(51) Int. Cl.
*G01S 1/00* (2006.01)

(52) U.S. Cl. .................. 342/357.15; 342/35.12

(58) Field of Classification Search ........... 342/357.02, 342/357.06, 357.12, 357.15; 701/213, 215
See application file for complete search history.

(56) References Cited

U.S. PATENT DOCUMENTS

| | | | | |
|---|---|---|---|---|
| 3,769,589 A * | 10/1973 | Buntschuh et al. | ......... | 455/260 |
| 4,445,118 A | 4/1984 | Taylor et al. | ............... | 343/357 |
| 4,457,006 A | 6/1984 | Maine | ........................ | 375/87 |
| 4,601,005 A | 7/1986 | Kilvington | .................. | 364/602 |
| 4,701,934 A | 10/1987 | Jasper | ........................... | 375/1 |
| 4,785,463 A | 11/1988 | Jane et al. | ...................... | 375/1 |
| 4,797,677 A | 1/1989 | MacDoran et al. | ......... | 342/352 |
| 4,959,656 A | 9/1990 | Kumar | ....................... | 342/418 |
| 4,998,111 A | 3/1991 | Ma et al. | .................... | 342/352 |
| 5,043,736 A | 8/1991 | Darnell et al. | ............. | 342/357 |
| 5,119,102 A | 6/1992 | Barnard | ..................... | 342/357 |
| 5,153,598 A | 10/1992 | Alves, Jr. | ................... | 342/352 |
| 5,202,829 A | 4/1993 | Geier | ......................... | 364/449 |
| 5,223,844 A | 6/1993 | Mansell et al. | ............. | 342/357 |
| 5,225,842 A | 7/1993 | Brown et al. | ............... | 342/357 |
| 5,245,634 A | 9/1993 | Averbuch | ................... | 375/108 |
| 5,271,034 A | 12/1993 | Abaunza | ....................... | 375/1 |

(Continued)

FOREIGN PATENT DOCUMENTS

DE            4424412            1/1996

(Continued)

OTHER PUBLICATIONS

International Search Report and Written Opinion of the International Searching Authority for International patent application No. PCT/US2005/005623 mailed on Jun. 29, 2005.

(Continued)

*Primary Examiner*—Dao Phan
(74) *Attorney, Agent, or Firm*—Myers Bigel Sibley & Sajovec PA

(57) ABSTRACT

A GPS receiver includes a digital signal processor (DSP) configured to receive a carrier-modulated signal and to provide an adaptive GPS search engine operative to search the carrier-modulated signal for GPS signals over a variable number of carrier timing hypotheses. A mobile terminal includes a mobile communications transceiver, a GPS receiver, and a common frequency source that provides a common frequency reference signal for the mobile communications transceiver and the GPS receiver of the mobile terminal. The common frequency source includes an automatic frequency control (AFC) circuit operative to adjust a frequency of the common frequency reference signal responsive to interaction of the mobile communications transceiver and a wireless communications system. The GPS receiver is configured to define a carrier timing search range thereof to accommodate the automatic adjustment of the frequency of the common frequency reference signal.

13 Claims, 5 Drawing Sheets

U.S. PATENT DOCUMENTS

| | | | | |
|---|---|---|---|---|
| 5,311,194 A | 5/1994 | Brown | | 342/357 |
| 5,317,323 A | 5/1994 | Kennedy et al. | | 342/357 |
| 5,323,163 A | 6/1994 | Maki | | 342/357 |
| 5,323,322 A | 6/1994 | Mueller et al. | | 364/449 |
| 5,365,450 A | 11/1994 | Schuchman et al. | | 364/449 |
| 5,379,047 A | 1/1995 | Yokev et al. | | 342/457 |
| 5,379,224 A | 1/1995 | Brown et al. | | 364/449 |
| 5,379,320 A | 1/1995 | Fernandes et al. | | 375/1 |
| 5,416,797 A | 5/1995 | Gilhousen et al. | | 375/705 |
| 5,418,538 A | 5/1995 | Lau | | 342/357 |
| 5,420,592 A | 5/1995 | Johnson | | 342/357 |
| 5,420,593 A | 5/1995 | Miles | | 342/357 |
| 5,430,759 A | 7/1995 | Yokev et al. | | 375/202 |
| 5,448,773 A | 9/1995 | McBurney et al. | | 455/343 |
| 5,483,549 A | 1/1996 | Weinberg et al. | | 375/200 |
| 5,491,486 A | 2/1996 | Welles et al. | | 342/357 |
| 5,621,646 A | 4/1997 | Enge et al. | | 364/449 |
| 5,663,734 A | 9/1997 | Krasner | | 342/357 |
| 5,663,735 A | 9/1997 | Eshenbach | | 342/357 |
| 5,781,156 A | 7/1998 | Krasner | | 342/357 |
| 5,812,087 A | 9/1998 | Krasner | | 342/357 |
| 5,874,914 A | 2/1999 | Krasner | | 342/357 |
| 6,075,987 A | 6/2000 | Camp, Jr. et al. | | 455/427 |
| 6,133,871 A | 10/2000 | Krasner | | 342/357.06 |
| 6,188,351 B1 | 2/2001 | Bloebaum | | 342/357.15 |
| 6,204,808 B1 | 3/2001 | Bloebaum et al. | | |
| 6,252,543 B1 | 6/2001 | Camp | | 342/357.06 |
| 6,295,023 B1 | 9/2001 | Bloebaum | | 342/357.06 |
| 6,323,803 B1 | 11/2001 | Jolley et al. | | 342/357.03 |
| 6,370,475 B1 | 4/2002 | Breed et al. | | 701/301 |
| 6,388,618 B1 | 5/2002 | Stilp et al. | | 342/457 |
| 6,389,291 B1 | 5/2002 | Pande et al. | | 455/456 |
| 6,405,132 B1 | 6/2002 | Breed et al. | | 701/301 |
| 6,407,699 B1 | 6/2002 | Yang | | 342/357.12 |
| 6,433,734 B1 | 8/2002 | Krasner | | 342/357.09 |
| 6,433,735 B1 | 8/2002 | Bloebaum et al. | | 342/357.1 |
| 6,535,815 B2 | 3/2003 | Bloebaum | | 701/213 |
| 6,577,271 B1 | 6/2003 | Groneymeyer | | |
| 6,583,758 B2 | 6/2003 | King | | 342/357.13 |
| 6,639,939 B1 * | 10/2003 | Naden et al. | | 375/140 |
| 6,642,886 B2 | 11/2003 | King | | 342/357.15 |
| 6,664,921 B2 | 12/2003 | Pratt | | 342/357.06 |
| 6,720,920 B2 | 4/2004 | Breed et al. | | 342/386 |
| 6,738,713 B2 | 5/2004 | Pratt | | 710/213 |
| 6,741,842 B2 * | 5/2004 | Goldberg et al. | | 455/192.2 |
| 2001/0005680 A1 | 6/2001 | Sih et al. | | |
| 2003/0008663 A1 | 1/2003 | Stein et al. | | 455/456 |
| 2003/0151547 A1 | 8/2003 | Mauro et al. | | |
| 2004/0063411 A1 | 4/2004 | Goldberg et al. | | 455/192.2 |

FOREIGN PATENT DOCUMENTS

| | | |
|---|---|---|
| EP | 0 444 738 | 9/1991 |
| EP | 0 447 978 | 9/1991 |
| EP | 1203965 A2 | 5/2002 |
| EP | 1 453 214 A2 | 9/2004 |
| GB | 2 273 218 | 6/1994 |
| GB | 2 308 033 | 6/1997 |
| WO | 94/28434 | 12/1994 |
| WO | 95/17686 | 6/1995 |
| WO | 96/15636 | 5/1996 |
| WO | 97/14049 | 4/1997 |
| WO | WO 03/023441 A2 | 3/2003 |

OTHER PUBLICATIONS

Krumvieda et al., "A Complete IF Software GPS Receiver: A Tutorial about the Details," published by Data Fusion Corporation, www.datafusion.com, 2004, pp. 1-22.

Data Sheet, "12-channel SoftGPS fpr TI's C55x," Spirit Corp., 2004, 1 page.

Data Sheet, "24-channel GPS + GLONASS receiver," Spirit Corp., 2004, 2 pages.

Lamance, et al., "Assisted GPS: A Low-Infrastructure Approach," GPS World, Jul. 5, 2004, 3 pages.

"GPS Software Receiver Toolkits," Data Fusion Corporation, http://www.datafusion.com/gps.htm, Jul. 8, 2004, 6 pages.

* cited by examiner

APPARATUS, METHODS AND COMPUTER PROGRAM PRODUCTS FOR GPS SIGNAL ACQUISITION USING AN ADAPTIVE SEARCH ENGINE

BACKGROUND OF THE INVENTION

The present invention relates to spread-spectrum communications, and more particularly, to apparatus, methods and computer program products for acquiring spread spectrum signals.

The Global Positioning System (GPS) is a space-based navigational communications system fielded by the United States government that uses satellites and associated ground-based components to provide positional information around the earth. Advantages of this navigational system over land-based systems include worldwide and continuous coverage, which may be highly accurate regardless of weather conditions. A similar system, the Global Orbiting Navigational Satellite System (GLONASS), is operated by the Russian Federation (the former Soviet Union), and another similar system, Galileo, will soon be deployed by the European Union and the European Space Agency.

In operation, GPS satellites orbit the earth and continually emit GPS radio signals. A GPS receiver, e.g., a portable device with a GPS processor, receives the radio signals from visible satellites and measures the time that the radio signal takes to travel from the GPS satellites to the GPS receiver antenna and, from this information, calculates a range for each acquired satellite, which may be used to determine terrestrial position of the receiver. Standalone GPS receivers are widely used by military forces, mariners, hikers, and surveyors. GPS capability may also be provided in mobile communications terminals (e.g., cellular handsets) to provide position location functionality that may be used, for example, for location based services (LBS).

Ephemeris information provided in the GPS satellite radio signal typically describes the satellite's orbit and velocity, which can be used to calculate the position of a GPS receiver. Generation of an accurate positional fix by a GPS receiver typically requires the acquisition of a set of navigational parameters from the navigational data signals from at least three GPS satellites.

An acquisition process for a GPS satellite signal may involve detection of a modulation code of the spread-spectrum GPS signal, so that it can be demodulated to obtain timing and/or satellite ephemeris information. Generally, the amount of searching required to detect the code can be reduced proportionate to the amount (or accuracy) of a priori timing and/or position information the GPS receiver possesses at the start of the search. For example, if the GPS receiver has a priori information of which GPS satellites are visible and information on the trajectories of these satellites, the receiver can reduce the number of satellites for which the receiver searches and the range of Doppler shifts and/or code phase shifts the receiver searches.

Many GPS receivers are programmed with almanac data, which coarsely describes the expected satellite positions for up to one year ahead. A GPS-enabled device, such as a mobile station, may be configured to receive assistance data that enables the device to roughly estimate its position with respect to the satellites of the GPS system. For example, local time and position estimates, satellite ephemeris and clock information, and visible satellite list (which varies with the location of the mobile station) may be transmitted to such a GPS-enabled device from terrestrially based infrastructure, such as a cellular network. Such assistance data can permit a GPS receiver to expedite the signal acquisition process.

A typical GPS-enabled device includes a radio processor that downconverts a radio signal received from an antenna to an intermediate frequency (IF) signal, which is then demodulated at each of a plurality of discrete IF frequencies corresponding to a range of possible frequency errors that may be attributable to Doppler shift due to relative movement of the device and the transmitting satellite, local oscillator frequency errors, and other sources. Each of the demodulated signals is then correlated with the satellite's assigned spreading code at each of a plurality of time shifts to generate correlation information that is used to determine the timing of the satellite's spread-spectrum signal. The receiver may then use this timing information to further demodulate the satellite data signal and determine its propagation time.

SUMMARY OF THE INVENTION

In some embodiments of the present invention, methods of acquiring GPS signals are provided. A first search space spanning a first number of carrier timing (e.g., frequency/period) hypotheses and a first number of code timing (e.g., frequency and/or phase) hypotheses is searched using, for example, a digital signal processor (DSP) based search engine, to acquire a first GPS signal. Responsive to acquisition of the first GPS signal, a second search space spanning a second number of carrier timing hypotheses and a second number of code timing hypotheses is defined, wherein the second number of carrier timing hypotheses is different than the first number of frequency hypotheses. The second search space is searched to acquire a second GPS signal. For example, the second number of carrier timing hypotheses may be greater than the first number of carrier timing hypotheses and the second number of code timing hypotheses may be less than the first number of code timing hypotheses. According to additional embodiments, the second search space may be defined to include at least one carrier frequency range corresponding to a frequency shift attributable to the local frequency source, for example, a common frequency source (e.g., crystal oscillator) shared with a mobile communications transceiver and having an automatic frequency control (AFC) circuit that varies the frequency of the common source.

In additional embodiments of the present invention, a GPS-enabled mobile terminal includes a common frequency source that provides a common frequency reference signal for a mobile communications transceiver and a GPS receiver of the mobile terminal. A frequency of the frequency reference signal is adjusted responsive to interaction of the mobile communications transceiver and a wireless communications system. A carrier timing search range of the GPS receiver is defined to accommodate the automatic adjustment of the frequency of the frequency reference signal. For example, the frequency of the frequency reference signal may be adjusted in discrete increments, and the carrier timing search range of the GPS receiver may be defined to include a carrier timing search range corresponding to an incremental change in the frequency of the frequency reference signal. The carrier timing search range of the GPS receiver may further be adjusted responsive to an AFC circuit, e.g., by receiving an indication from the AFC circuit and/or by detecting a systematic frequency error.

In some embodiments of the present invention, a GPS receiver includes a digital signal processor (DSP) configured to receive a carrier-modulated signal and to provide an adaptive GPS search engine operative to search the carrier-modulated signal for GPS signals over a variable number of carrier timing hypotheses. The GPS search engine may be operative to search over a first search space spanning a first number of carrier timing hypotheses and a first number of code timing hypotheses to acquire a first GPS signal. The GPS search engine is further operative to define, responsive to acquisition of the first GPS signal, a second search space spanning a second number of carrier timing hypotheses and a second number of code timing hypotheses, the second number of carrier timing hypotheses different than the first number of carrier timing hypotheses, and to search the second search space to acquire a second GPS signal.

According to further embodiments of the present invention, a mobile terminal includes a mobile communications transceiver, a GPS receiver, and a common frequency source that provides a common frequency reference signal for the mobile communications transceiver and the GPS receiver of the mobile terminal. The common frequency source includes an automatic frequency control (AFC) circuit operative to adjust a frequency of the common frequency reference signal responsive to interaction of the mobile communications transceiver and a wireless communications system. The GPS receiver is configured to define a carrier timing search range thereof to accommodate the automatic adjustment of the frequency of the common frequency reference signal. The AFC circuit may be operative to adjust the frequency of the common frequency reference signal in discrete increments, and the GPS receiver may be operative to define the carrier timing search range to include a carrier timing search range corresponding to an incremental change in the frequency of the common frequency reference signal. The GPS receiver may be operative to adjust the carrier timing search range responsive to the AFC circuit.

In further embodiments of the present invention, computer program products for acquiring GPS signals are provided. A computer program product includes computer program code embodied in a computer readable storage medium, the computer program code comprising code configured to search over a first search space spanning a first number of carrier timing hypotheses and a first number of code timing hypotheses to acquire a first GPS signal, code configured to define, responsive to acquisition of the first GPS signal, a second search space spanning a second number of carrier timing hypotheses and a second number of code timing hypotheses, the second number of carrier timing hypotheses different than the first number of carrier timing hypotheses, and code configured to search the second search space to acquire a second GPS signal.

In some embodiments of the present invention, computer program products are provided for operating a GPS receiver of a GPS-enabled mobile terminal including a common frequency source that generates a common frequency reference signal for a mobile communications transceiver and the GPS receiver and that automatically adjusts a frequency of the common frequency reference signal responsive to interaction of the mobile communications transceiver with a wireless communication system. A computer program product includes computer program code embodied in a computer readable storage medium, the computer program code comprising code configured to define a carrier timing search range of the GPS receiver to accommodate the automatic adjustment of the frequency of the common frequency reference signal.

DETAILED DESCRIPTION OF EXEMPLARY EMBODIMENTS

Figure 1:
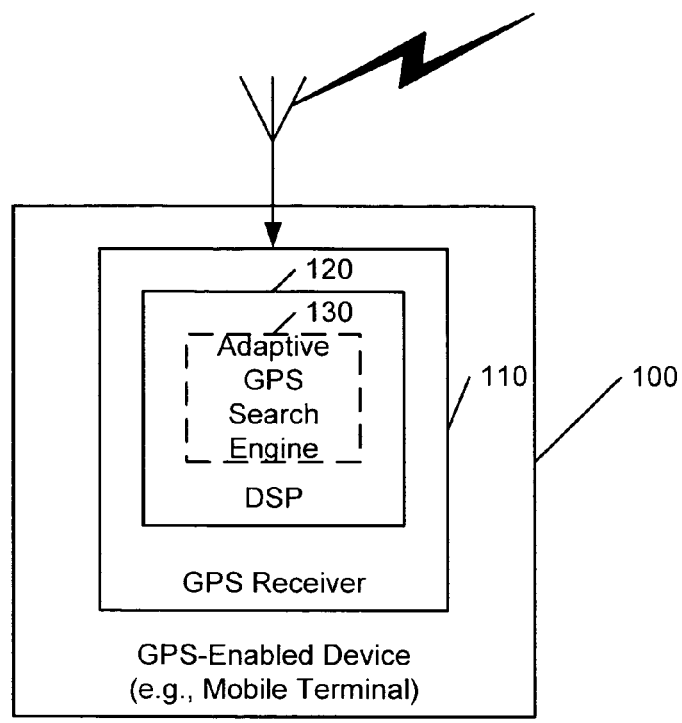
FIG. 1 is a schematic diagram illustrating a GPS-enabled apparatus according to some embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the terms "comprising", "comprises", "includes" and "including" are open-ended, i.e., refer to one or more stated elements, steps and/or functions without precluding one or more unstated elements, steps and/or functions. It will also be understood that the term "and/or" as used herein refers to and encompasses any and all possible combinations of one or more of the associated listed items. It will be further understood that when transfer, communication, or other interaction is described as occurring "between" elements, such transfer, communication or other interaction may be unidirectional and/or bidirectional.

The present invention is described below with reference to block diagrams and/or operational illustrations of methods and wireless terminals according to embodiments of the invention. It will be understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some alternate implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

According to some embodiments of the present invention, electronic apparatus may include a radio communications circuit configured to provide operations described herein. Such apparatus may include any of a number of types of devices, including, but not limited to: cellular handsets;

wireless headsets for use with telecommunications devices and/or computers; computers and peripherals that include a radio interface; personal communication terminals that may combine a cellular wireless terminal with data processing, facsimile and data communications capabilities; and personal data assistants (PDA) that can include a wireless transceiver, pager, Internet/intranet access, local area network interface, wide area network interface, Web browser, organizer, and/or calendar.

Computer program code for carrying out operations of the present invention may be written in an object oriented programming language such as Java®M, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package.

Figure 2:
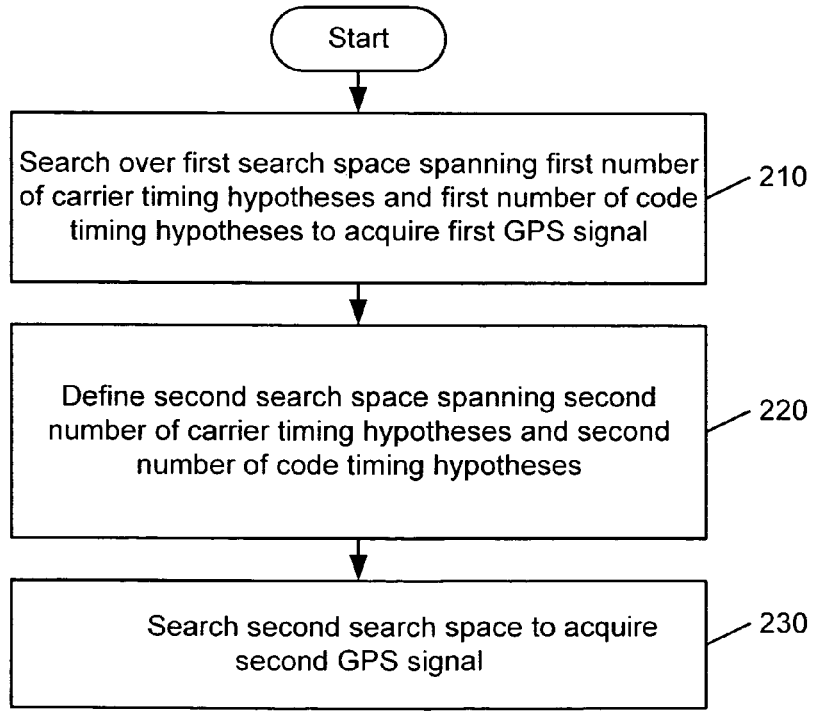
FIGS. 2 and 3 are flowcharts illustrating exemplary operations of a GPS-enabled apparatus according to further embodiments of the present invention.

FIGS. 1 and 2 illustrate exemplary apparatus and operations thereof according to some embodiments of the present invention. More particularly, FIG. 1 illustrates a GPS-enabled device 100 including a GPS receiver 110 that provides an adaptive GPS search engine 130, here shown as implemented in a digital signal processor 120. The adaptive GPS search engine 130 may use software-based carrier demodulation techniques as described, for example, in copending U.S. patent application Ser. No. 10/919,114, entitled *Apparatus, Methods And Computer Program Products For Signal Acquisition Using Common Demodulation Templates*, filed concurrently herewith and incorporated by reference herein in its entirety. In the aforementioned application, a search algorithm may include carrier demodulation for multiple carrier frequency hypotheses by applying a common carrier demodulation template to signal samples that are appropriately manipulated to account for timing differences between the reference carrier frequency of the template and the various carrier frequency hypotheses.

Such a software-based approach may allow for generation of search spaces with a fully adaptive carrier timing dimensions, i.e., the number and resolution of the frequency hypotheses may be readily varied, which contrasts with conventional receivers that use a fixed number of frequency hypotheses. Thus, for example, the number of Doppler hypotheses tested can be increased as more GPS signals are acquired.

As shown in FIG. 2, in some embodiments, the search engine 130 may be configured to search over a first search space spanning a first number of carrier timing hypotheses and a first number of code timing hypotheses to acquire a first GPS signal (block 210). Responsive to acquisition of the first GPS signal, the GPS search engine defines a second search space spanning a second number of carrier timing hypotheses and a second number of code timing hypotheses, wherein the second number of carrier timing hypotheses is different, e.g., greater, than the first number of carrier timing hypotheses (block 220). The GPS search engine 130 is operative to search the second search space to acquire a second GPS signal (block 230). It will be appreciated that the number of carrier timing hypotheses, the number of code timing hypotheses, and the integration time over which a search is performed (e.g., over which correlation metrics are accumulated) may, in general, be chosen to optimize particular performance parameters, such as initial time to fix, mean time to fix and/or accuracy.

It may be desirable to increase the number carrier timing hypotheses for several reasons. For example, after an initial GPS signal is acquired, it may be desirable to search for multiple additional GPS signals simultaneously. As searching for each of these typically will require a search over a carrier timing (Doppler) search range, the total number of carrier timing hypotheses may increase. In addition, when searching for increasingly weaker GPS signals, it may be desirable to provide finer Doppler resolution, thus increasing the number of carrier timing hypotheses.

Figure 3:
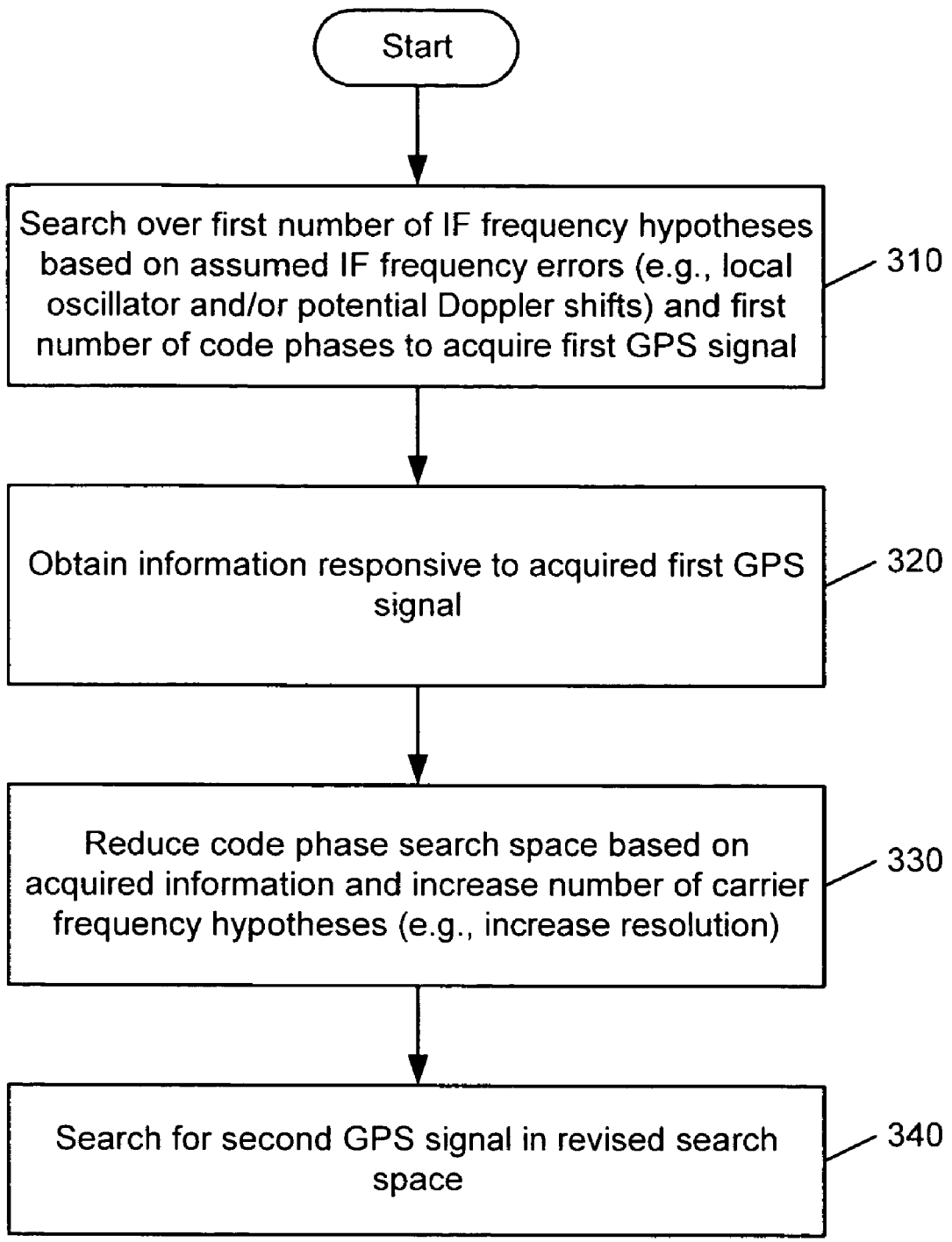

As will be understood by those skilled in the art, acquisition of a GPS signal may involve reception of a radio frequency (RF) signal (e.g., an L1 signal), downconversion of the received signal to an intermediate frequency (IF) signal, and demodulation of the IF signal to acquire the GPS signal therein. FIG. 3 illustrates exemplary operations using an adaptive approach for searching for a GPS signal in such an IF signal according to further embodiments of the present invention.

A GPS search engine searches over a first number of intermediate frequency (IF) hypotheses based on, for example, assumed IF frequency errors (e.g., Doppler shifts and/or local oscillator errors) and a first number of code phase hypotheses (block 310). For example, for a device seeking to acquire a first GPS signal as part of generating an initial position fix, the GPS search engine might possess ephemeris data from an almanac and/or from an assistance data channel (e.g., from a cellular base station or other terrestrial GPS assistance data source), and might use this information to determine a range of Doppler shifts that may apply to acquiring a signal from a particular GPS satellite. The first number of IF frequency hypotheses may be defined to cover this range of Doppler shifts. The IF frequency hypotheses might also be defined to account for known errors of a frequency source used by the device for demodulating received radio signals.

Responsive to acquisition of a first GPS signal, the GPS search engine may then obtain, for example, more accurate information as to the timing of the GPS system relative to the terminal's own internal time base and/or the terminal's position with respect to the GPS satellites (block 320). Using an adaptive DSP-based structure, the GPS search engine's search space can be adapted, responsive to information from the first acquired signal, to provide a greater number of IF frequency hypotheses and a lesser number of code phase hypotheses (block 330), which is used to search for a second GPS signal (block 340). In this manner, for example, a much finer search of the IF frequency dimension could be provided for the second GPS signal (and for successive signals).

According to further embodiments of the present invention, a mobile communications terminal may include a mobile communications transceiver and a GPS receiver that share a common frequency reference. The GPS receiver may be configured to provide an adaptive search engine along the lines described above and which may be used to compensate for automatic frequency control (AFC) associated with the mobile communications transceiver.

Figure 4:
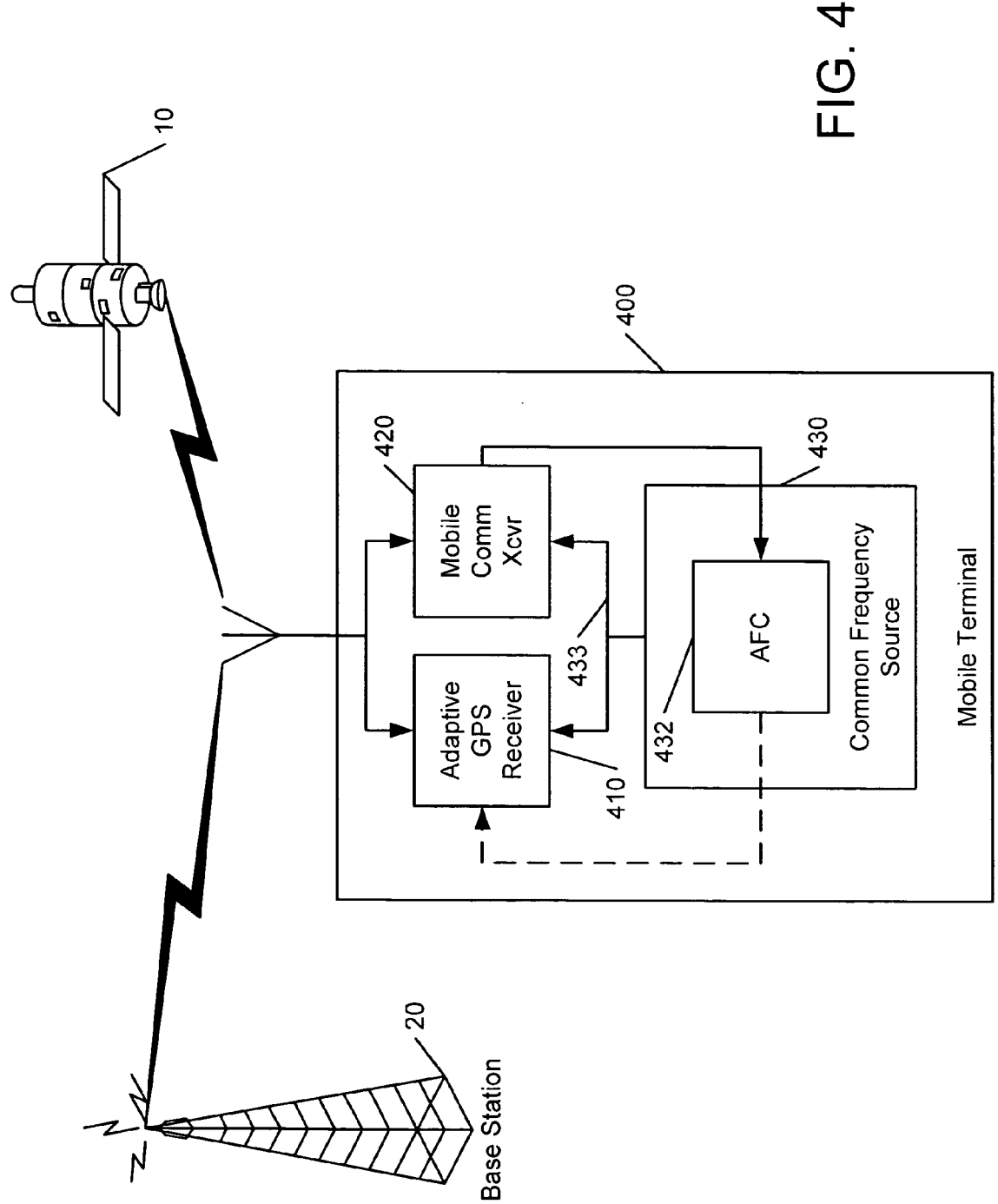
FIG. 4 is a schematic diagram of a GPS-enabled mobile terminal according to some embodiments of the present invention.

FIG. 4 illustrates a GPS-enabled mobile terminal 400 according to some embodiments of the present invention. The terminal 400 includes a mobile communications transceiver 420 that is configured to communicate with components of a wireless communications system, e.g., a base station 20. The terminal 400 further includes an adaptive GPS receiver 410, e.g., a receiver that includes a DSP-based adaptive GPS search engine as described above, which is operative to receive GPS signals from one or more GPS satellites 10. The terminal also includes a common frequency source 430 that generates a common frequency reference signal 433 that is used by the mobile communications transceiver 420 and the adaptive GPS receiver 410.

For example, the common frequency source 430 may comprise a crystal oscillator circuit, and the common frequency reference signal 433 may comprise a nominal 13 or 19.2 MHz clock signal produced by the crystal oscillator circuit and used by the mobile communications transceiver 420. The common frequency reference signal 433 may be divided down by the GPS receiver 410 for use as a timing reference for its demodulation operations.

As shown for the embodiments of FIG. 4, the common frequency source 430 includes an AFC circuit 432 that adjusts the frequency of the common frequency reference signal 433 responsive to communication by the mobile communications transceiver 420, for example, to synchronize the common frequency reference signal 433 to a frequency of the base station 20. Such adjustment may be done in incremental steps.

It will be understood that the action of the AFC circuit 432 may, thus, affect the operation of the adaptive GPS receiver 410, e.g., may introduce frequency errors due to changes in the common frequency reference signal. For example, shifts in the reference frequency supplied to the GPS receiver 410 may cause a displacement of the receiver's search space in the carrier frequency dimension such that the carrier frequency of the signal being searched for may no longer be within the search space. According to further embodiments of the present invention, an adaptive GPS search engine along the lines described above with reference to FIGS. 1-3 may be configured to accommodate such AFC-introduced effects.

Figure 5:
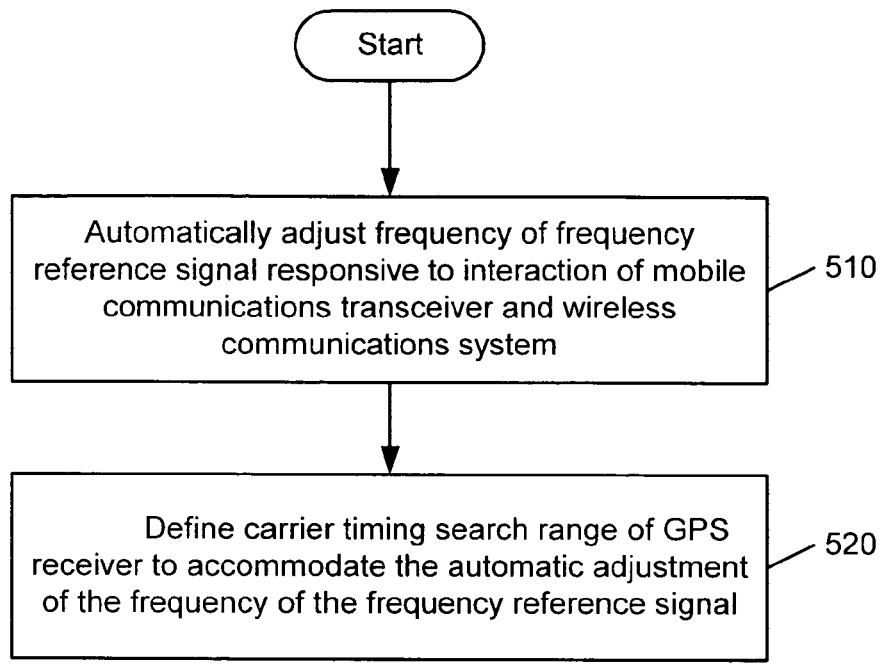
FIGS. 5-7 are flowcharts illustrating exemplary operations of a GPS-enabled mobile terminal according to further embodiments of the present invention.
Figure 6:
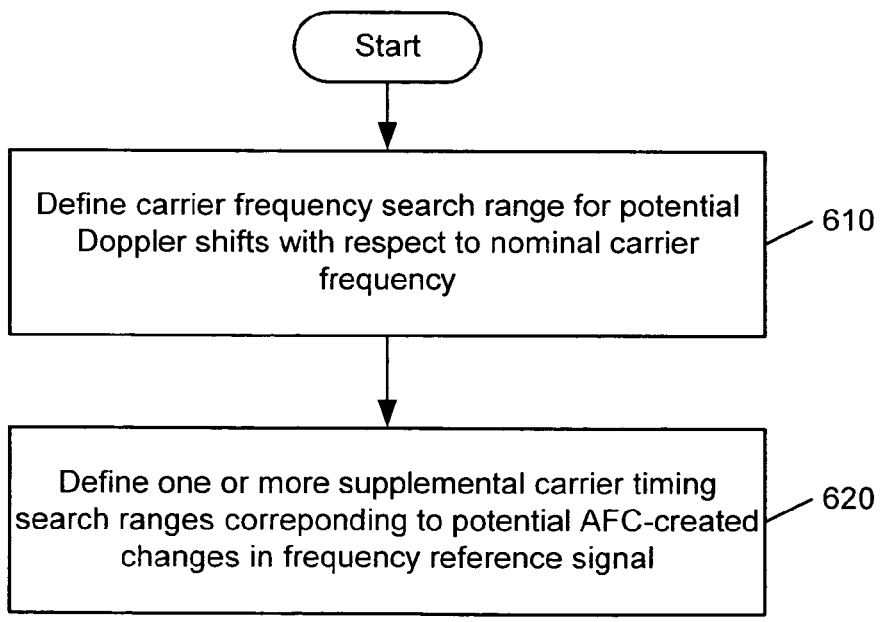

For example, as shown in FIG. 5, the AFC circuit 432 may adjust the frequency of the common frequency reference signal responsive to interaction of the mobile communications transceiver 420 and the wireless communications system (block 510). The adaptive GPS receiver 410 may define a carrier timing (e.g., frequency) search range to accommodate the automatic adjustment of the frequency of the common frequency reference signal, e.g., by extending a range of frequency hypotheses searched to incorporate hypotheses associated with possible AFC-induced shifts (Block 520). For example, as shown in FIG. 6, the search engine could define a carrier timing search range corresponding to a nominal frequency for the frequency reference plus hypotheses corresponding to expected Doppler shifts of the GPS signal being sought (block 610), along with one or more auxiliary ranges of carrier timing hypotheses that correspond to such Doppler shifts coupled with potential step increases and/or decreases in the frequency of the GPS receiver's frequency reference signal (block 620). Such auxiliary ranges could be determined, for example, by computation and/or by accessing a lookup table that relates AFC increments to carrier timing shifts. It will be understood that the expanded search space may be contiguous or segmented.

Figure 7:
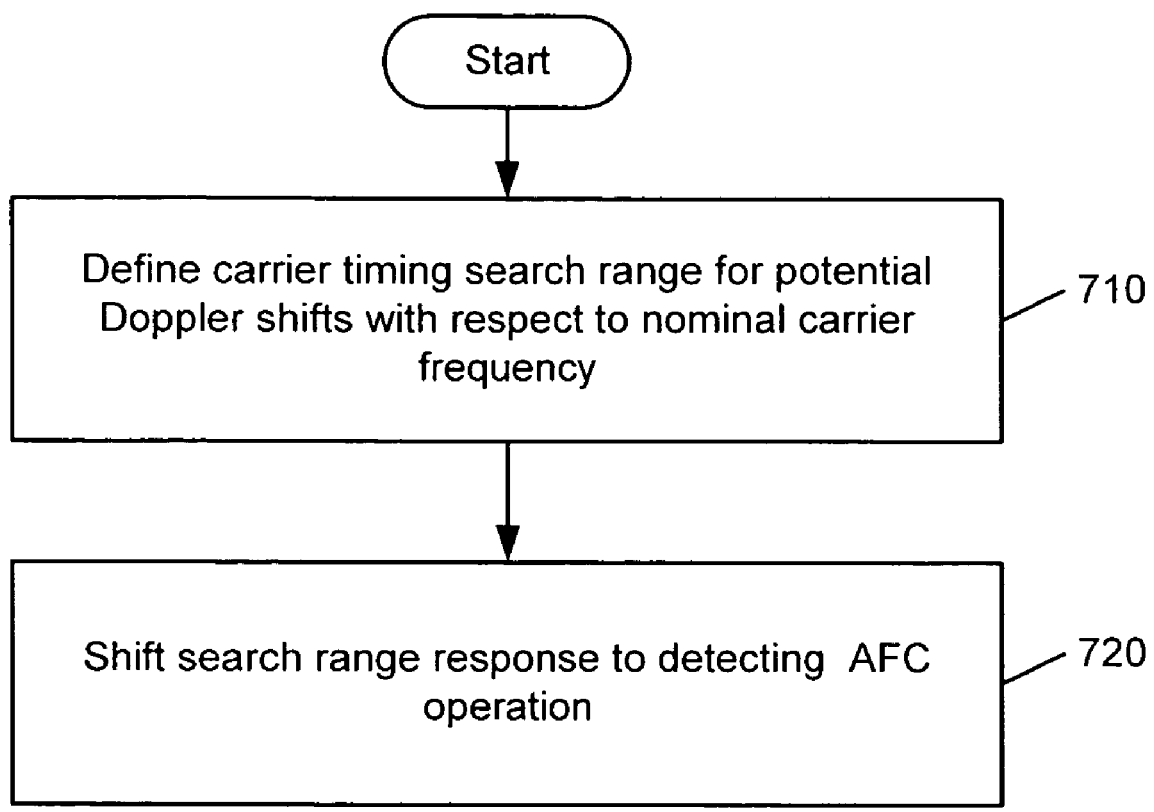

As shown in FIG. 7, alternatively, or in addition to, the operations shown in FIG. 6, the GPS search engine could define a carrier timing search range for a current nominal frequency reference signal frequency (710), and could then shift the search range responsive to detection of an AFC-induced shift in the reference signal frequency (block 720). Such a shift could occur, for example, responsive to information provided to the GPS receiver from the AFC circuit, as shown in dashed line in FIG. 4, and/or could occur responsive to detecting a systematic carrier timing error when searching for GPS signals.

FIGS. 1-7 illustrate architecture, functionality, and operations of possible implementations of apparatus, methods and computer program products according to various embodiments of the present invention. It should also be noted that, in some alternative implementations, the acts noted in the diagrams may occur out of the order noted in the figures. For example, two operations shown in succession may, in fact, be executed substantially concurrently, or the operations may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed:

1. A method of acquiring GPS signals, the method comprising:
searching over a first search space spanning a first number of carrier timing hypotheses and a first number of code timing hypotheses to acquire a first GPS signal;
responsive to acquisition of the first GPS signal, defining a second search space spanning a second number of carrier timing hypotheses and a second number of code timing hypotheses, wherein the second number of carrier timing hypotheses is greater than the first number of carrier timing hypotheses and wherein the second number of code timing hypotheses is less than the first number of code timing hypotheses; and
searching the second search space to acquire a second GPS signal.

2. A method according to claim 1, wherein the second search space has a greater carrier frequency resolution that the first search space.

3. A method according to claim 1, wherein the second search space has a lesser carrier timing search range than the first search space.

4. A method according to claim 1:
wherein searching over a first search space spanning a first number of carrier timing hypotheses and a first number of code timing hypotheses to acquire a first GPS signal comprises searching for a first integration period; and
wherein searching the second search space to acquire a second GPS signal comprises searching for a second integration period greater than the first integration period.

5. A method according to claim 1:
wherein searching the second search space to acquire a second GPS signal comprises demodulating a radio signal responsive to a local frequency source; and
wherein defining a second search space spanning a second number of carrier timing hypotheses and a second number of code timing hypotheses comprises defining the second search space to include at least one carrier timing search range corresponding to a frequency shift attributable to the local frequency source.

6. A method according to claim 5, wherein the local frequency source comprises a common frequency source for a mobile communications transceiver and a GPS receiver of a mobile terminal, the common frequency source producing a common frequency reference signal having a frequency that is automatically adjusted responsive to interaction of the mobile communications transceiver and a wireless communications system, and wherein defining the second search space to include at least one carrier timing search range corresponding to a frequency shift attributable to the local frequency source comprises defining a carrier timing search range of the GPS receiver to accommodate the automatic adjustment of the frequency of the common frequency source.

7. A method according to claim 6, wherein defining a carrier timing search range of the GPS receiver to accommodate the automatic adjustment of the frequency of the common frequency reference signal comprises including a carrier timing search range corresponding to an incremental change in the frequency of the common frequency reference signal.

8. A method according to claim 6, wherein the mobile terminal includes an automatic frequency control (AEC) circuit that automatically adjusts the frequency of the common frequency reference signal, and wherein defining a carrier timing search range of the GPS receiver to accommodate the automatic adjustment of the frequency of the common frequency reference signal comprises adjusting the carrier timing search range of the GPS receiver responsive to the AFC circuit.

9. A GPS receiver, comprising:
a digital signal processor (DSP) configured to receive a carrier-modulated signal and to provide an adaptive GPS search engine operative to search the carrier-modulated signal for GPS signals over a variable number of carrier timing hypotheses and code timing hypotheses, wherein the GPS search engine is operative to search over a first search space spanning a first number of carrier timing hypotheses and a first number of code timing hypotheses to acquire a first GPS signal, to define a second search space spanning a second number of carrier timing hypotheses and a second number of code timing hypotheses responsive to acquisition of the first GPS signal and to search the second search space to acquire a second GPS signal, wherein the second number of carrier timing hypotheses is greater than the first number of carrier timing hypotheses and wherein the second number of code timing hypotheses is less than the first number of code timing hypotheses.

10. A GPS receiver according to claim 9, wherein the GPS search engine is operative to demodulate the carrier-modulated signal responsive to a local frequency source and to define the second search space to include at least one carrier timing search range corresponding to a frequency shift attributable to the local frequency source.

11. A GPS receiver according to claim 10, wherein the local frequency source comprises a common frequency source for a mobile terminal transceiver and the GPS receiver in a mobile terminal, the common frequency source producing a common frequency reference signal having a frequency that is automatically adjusted responsive to interaction of the mobile communications transceiver and a wireless communications system, and wherein the GPS search engine is operative to define a carrier timing search range thereof to accommodate the automatic adjustment of the frequency of the common frequency reference signal.

12. A computer program product for acquiring GPS signals, the computer program product including computer program code embodied in a computer readable storage medium, the computer program code comprising:
code configured to search over a first search space spanning a first number of carrier timing hypotheses and a first number of code timing hypotheses to acquire a first GPS signal;
code configured to define, responsive to acquisition of the first GPS signal, a second search space spanning a second number of carrier timing hypotheses and a second number of code timing hypotheses, the second number of carrier timing hypotheses greater than the first number of carrier timing hypotheses and the second number of code timing hypotheses less than the first number of code timing hypotheses; and
code configured to search the second search space to acquire a second GPS signal.

13. A computer program product according to claim 12:
wherein the code configured to search the second search space to acquire a second GPS signal comprises code configured to demodulate a carrier-modulated signal responsive to a local frequency source; and
wherein the code configured to define a second search space spanning a second number of carrier timing hypotheses and a second number of code timing hypotheses comprises code configured to define the second search space to include at least one carrier timing search range corresponding to a frequency shift attributable to the local frequency source.

* * * * *

UNITED STATES PATENT AND TRADEMARK OFFICE
CERTIFICATE OF CORRECTION

| | | |
|---|---|---|
| PATENT NO. | : 7,358,897 B2 | Page 1 of 1 |
| APPLICATION NO. | : 10/919174 | |
| DATED | : April 15, 2008 | |
| INVENTOR(S) | : Camp, Jr. | |

It is certified that error appears in the above-identified patent and that said Letters Patent is hereby corrected as shown below:

Column 9, Claim 8, Line 12: Please correct "(AEC)"
To read -- (AFC) --

Signed and Sealed this

First Day of July, 2008

JON W. DUDAS
*Director of the United States Patent and Trademark Office*